UNITED STATES PATENT OFFICE.

ARNOLD ERLENBACH AND KARL MARX, OF DESSAU, GERMANY, ASSIGNORS TO ACTIEN GESELLSCHAFT FÜR ANILIN FABRIKATION, OF BERLIN, GERMANY.

DYES FOR DYEING FURS, HAIRS, AND THE LIKE.

1,105,501.   Specification of Letters Patent.   Patented July 28, 1914.

No Drawing.   Application filed November 6, 1912.   Serial No. 729,874.

*To all whom it may concern:*

Be it known that we, ARNOLD ERLENBACH and KARL MARX, the former a subject of the King of Bavaria and the latter of the Duke of Brunswick, both residing at Dessau, Germany, the former Schillerstrasse 5 and the latter Albrechtstrasse 16, our post-office addresses being, the former Schillerstrasse 5, Dessau, Germany, and the latter Albrechtstrasse 16, Dessau, Germany, have invented certain new and useful Improvements in New Dyes for Dyeing Furs, Hairs, and the like, of which the following is a specification.

In U. S. Letters Patent No. 992,947 there are claimed new dyes for furs, hairs and the like which comprise an aromatic para-diamin and meta-diaminoanisol

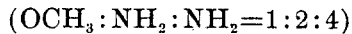

or meta-diaminophenetol

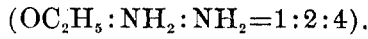

Now according to our present invention, instead of an aromatic para-diamin, we make use of a N-monoalkyl derivative or an unsymmetrical dialkyl derivative of an aromatic para-diamin in conjunction with an organic meta-diamin of the general formula:

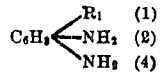

in which formula R means an alkoxy group. The para-diamin compounds serving for the present invention possess the following general formula:

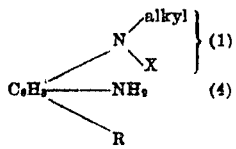

in which formula R and X each mean a univalent substituent. New dyes according to the present invention may therefore, for instance, be of the following composition: para-aminodimethylanilin meta-diaminoanisol, para-aminomonoethylanilin meta-diaminoanisol, para-aminodiethyl-anilin meta-diaminophenetol, etc. These new preparations are most excellent dyes for furs, hairs and the like; in applying them, for instance, to furs which may be previously mordanted or not, tints of great stability are obtained which are more bluish than those obtained with the new preparation of U. S. Letters Patent 992,947 and which are distinguished by a full shade overhand in comparison with the dyeings obtained according to the prior invention.

The result could not be foreseen from the prior state of art and more especially from the patent just cited because there are no rules known as to the behavior of such mixtures; it was as well possible that for instance a mixture of para-aminodimethylanilin and meta-diaminoanisol would be by no means suitable for the purpose in question.

As to the employment of our new preparations they may be used as usually, in combination with a free inorganic base, and more especially with ammonium hydroxid and in the presence of a suitable oxidizing agent, such as hydrogen peroxid.

The following examples may serve to illustrate our invention, the parts being by weight:

(1). A new dye according to our present invention may be prepared as follows: 6 parts of para-aminodimethylanilin are thoroughly incorporated with 3 parts of meta-diaminoanisol care being taken that a homogeneous mass is obtained. In dyeing a fur, and more especially a fur mordanted with ferrous sulfate, with this new dye a fine and deep blue-black with a full sight overhand is obtained.

(2). By mixing 6 parts of para-aminomonoethylanilin and 3 parts of meta-diaminoanisol a new dye is obtained which for instance by applying it to a fur mordanted with ferrous sulfate in suitable proportions produces an intense bluish black of a great stability and of a full sight overhand.

It is obvious to those skilled in the art that our present invention is not limited to the foregoing examples or to the details given therein. Thus for instance instead of para-aminodimethylanilin para-aminodiethylanilin or instead of para-aminoethylanilin para-aminomethylanilin may be employed as well as a derivative of these amins containing a substituent attached to the benzene nucleus. Furthermore instead of meta-diaminoanisol meta-diaminophenetol may be used.

It is obvious that in preparing the new dyes according to our present invention from such other diamins the proportions of the ingredients may be varied in order to obtain the best results, the special mixtures for a new dye depending of course to a great extent upon the desired shade as well as upon the special nature of the furs, hairs, etc., to be dyed.

The new dyes may be offered to the trade in the solid state as indicated in the above examples or in solution.

Having now described our invention and the manner in which it may be performed what we claim is,—

1. As new articles of manufacture new dyes for furs, hairs and the like comprising an aromatic para-diamin of the general formula:

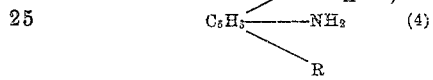

in which formula R and X each mean a univalent substituent, and an aromatic meta-diamin of the general formula:

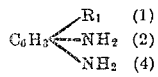

in which formula $R_1$ means an alkoxy group.

2. As new articles of manufacture new dyes for furs, hairs and the like comprising an aromatic para-diamin of the general formula:

in which formula R means a univalent inorganic substituent, and X means a univalent organic substituent, and an aromatic meta diamin of the general formula:

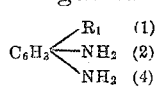

in which formula $R_1$ means an alkoxy group.

3. As new articles of manufacture new dyes for furs, hairs and the like comprising an aromatic para-diamin of the general formula:

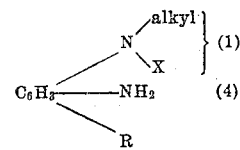

in which formula R means a hydrogen atom and X means an alkyl group, and an aromatic meta-diamin of the general formula:

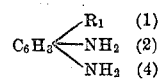

in which formula $R_1$ means an alkoxy group.

4. As new articles of manufacture new dyes for furs, hairs and the like comprising an aromatic para-diamin of the general formula:

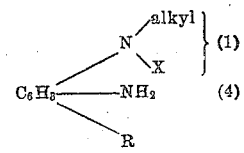

in which formula R means a hydrogen atom and X means a methyl group, and an aromatic meta-diamin of the general formula:

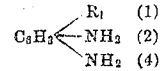

in which formula $R_1$ means an alkoxy group.

5. As a new article of manufacture a new dye for furs, hairs and the like, comprising a para-aminodimethylanilin and an aromatic meta-diamin of the general formula:

in which formula $R_1$ means an alkoxy group.

6. As a new article of manufacture a new dye for furs, hairs and the like comprising a para-aminodimethylanilin and meta-diaminoanisol.

In testimony whereof we have hereunto set our hands in presence of two subscribing witnesses.

ARNOLD ERLENBACH.
KARL MARX.

Witnesses:
 WOLDEMAR HAUPT,
 HENRY HASPER.